United States Patent [19]
Carmine

[11] Patent Number: 4,914,899
[45] Date of Patent: Apr. 10, 1990

[54] ATTACHMENT TO A LAWN TRIMMER

[76] Inventor: Benjamin C. Carmine, 415 Shadow Creek Dr., Seabrook, Tex. 77586

[21] Appl. No.: 208,249

[22] Filed: Jun. 17, 1988

Related U.S. Application Data

[63] Continuation-in-part of Ser. No. 72,790, Jul. 13, 1987, Pat. No. 4,803,831, which is a continuation-in-part of Ser. No. 812,757, Dec. 23, 1985, Pat. No. 4,679,385.

[51] Int. Cl.⁴ .............................................. A01D 34/84
[52] U.S. Cl. ...................................... 56/16.7; 56/16.9; 172/17
[58] Field of Search ...................... 56/12.7, 16.7, 16.9, 56/17.1, 17.2, 17.4, 17.5; 172/13, 15, 17

[56] References Cited
U.S. PATENT DOCUMENTS

| | | | |
|---|---|---|---|
| 2,672,002 | 3/1954 | Nelson | 56/16.9 |
| 2,827,748 | 3/1958 | Simpson | 56/16.9 |
| 3,221,481 | 12/1965 | Mattson et al. | 56/17.1 X |
| 4,224,784 | 9/1980 | Hansen et al. | 56/12.7 X |
| 4,679,385 | 7/1987 | Carmine | 56/16.9 |
| 4,712,363 | 12/1987 | Claborn | 56/12.7 X |
| 4,803,831 | 2/1989 | Carmine | 56/17.5 X |

Primary Examiner—Stephen J. Novosad
Assistant Examiner—David J. Bagnell
Attorney, Agent, or Firm—Gunn, Lee & Miller

[57] ABSTRACT

An attachment for temporarily converting an electrically powered flexible cord-type lawn trimmer to a lawn edger is disclosed. The attachment comprises a body and guide assembly for mounting to the housing of the lawn trimmer. The attachment includes an edge guide and wheels mounted to the body of the attachement.

11 Claims, 3 Drawing Sheets

ATTACHMENT TO A LAWN TRIMMER

RELATED APPLICATIONS

This application is a continuation-in-part application of U.S. Ser. No. 072,790, filed July 13, 1987, now U.S. Pat. No. 4,803,831, which is a continuation-in-part application of U.S. Ser. No. 812,757, filed Dec. 23, 1985, now U.S. Pat. No. 4,679,385.

BACKGROUND OF THE DISCLOSURE

The present invention is directed to an attachment for a lawn trimmer, particularly, to an attachment for converting a flexible line cord lawn trimmer to a lawn edger so that the flexible cord of the trimmer may be used for both trimming and edging the lawn.

Lawn edgers, both gasoline and electric powered, are known and have been used for many years. Line trimmers, for example nylon cord trimmers, which have the capability of being used as either a lawn edger or a lawn trimmer are also known in the prior art. However, nylon cord trimmers presently available are difficult to use as lawn edgers because the user must orient the line trimmer so that the orbit of the cutter line is perpendicular to the ground and parallel to the sidewalk or curb being edged. Furthermore, the user must position and hold the line trimmer, while in motion, a sufficient distance above the ground and away from the concrete so that the nylon cord does not strike the concrete or the ground with such force that it wears abnormally.

Typically, electrically powered nylon cord trimmers presently available include a motor housing having a shaft extending from the housing at an acute angle. A D-shaped handle is generally located about the midpoint of the shaft and a pistol-grip handle having a trigger, which must be depressed to energize the line trimmer motor, is attached to the terminal end of the shaft. When using this type of device as a lawn edger, the housing is rotated so that the grip portion of the handle is facing upwardly. Also, the shaft of the line trimmer must be held by the D-shaped handle in a position so that the motor housing is oriented such that the orbital plane of the cutter line is perpendicular to the ground. This typically requires the user to stoop over and grasp the D-shaped handle with one hand and hold the pistol-grip of the handle in the other hand to keep the line trimmer properly oriented for edging. Since the pistol-grip of the handle is facing upwardly in this position, the user cannot depress the dead-man type switch with his index finger and must therefore press the switch with his thumb. While in this rather awkward position, the user must also walk along the lawn edge, at all times attempting to keep the line trimmer housing properly oriented so that a straight edge can be cut. This is extremely difficult to accomplish and very tiring for the user to maintain such an awkward position for an extended period of time in order to edge the lawn.

Attachments for line trimmers are available as exemplified by U.S. Pat. No. 4,224,784 to Hanson, et al., and other conversion systems disclosed therein. The Hanson device comprises an attachment incorporating a collar with support legs attached to it and wheels attached to the support legs. A U-shaped brace is attached to the support legs holding them at an angle to each other. The collar is positioned about the shaft extending from the line trimmer motor housing. The line trimmer is oriented so that its face is perpendicular to the ground. The collar is secured to the shaft with the head of the line trimmer between the ends of the U-shaped brace and spaced above the ground.

The prior art lawn edging devices have several disadvantages which are overcome by the novel lawn edger attachment of the present disclosure. Edging with the attachment of the present disclosure mounted on a nylon cord trimmer produces a straighter, wider, deeper and cleaner cut than edging with a hand held line trimmer or a conventional metal blade edger. The apparatus of the present disclosure is provided with a downwardly extending edge guide which extends into the trench separating the edge of the sidewalk or curb from the lawn. The edge guide contacts and slides along the vertical surface of the sidewalk or curb, enabling the user to form a cut which is substantially parallel to the sidewalk or curb.

A further advantage of the apparatus of the present disclosure is the ease of converting a lawn trimmer into a lawn edger by attaching the apparatus of the present disclosure to the lawn trimmer. The usefulness of the lawn trimmer as a trimmer is not impaired or diminished when the edging apparatus is detached from the lawn trimmer.

SUMMARY OF THE INVENTION

The lawn edger attachment of the present invention comprises a body adapted for mounting the attachment to a commercially available flexible line cord lawn trimmer. The body of the attachment includes a recess formed therein profiled to receive a portion of the lawn trimmer motor housing. The spool and line housing of the lawn trimmer projects beyond the surface of the body of the attachment. An edge guide extends downwardly from the body of the attachment for guiding the lawn trimmer along the sidewalk or curb. A pair of wheels are mounted on the body of the attachment for rolling the lawn trimmer along the edge of the sidewalk. A strap, or a thumb screw or bolt and wing nut or other type of connector secure the attachment to the trimmer housing.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

DETAILED DESCRIPTION OF THE PREFERRED EMBODIMENT

Figure 2:
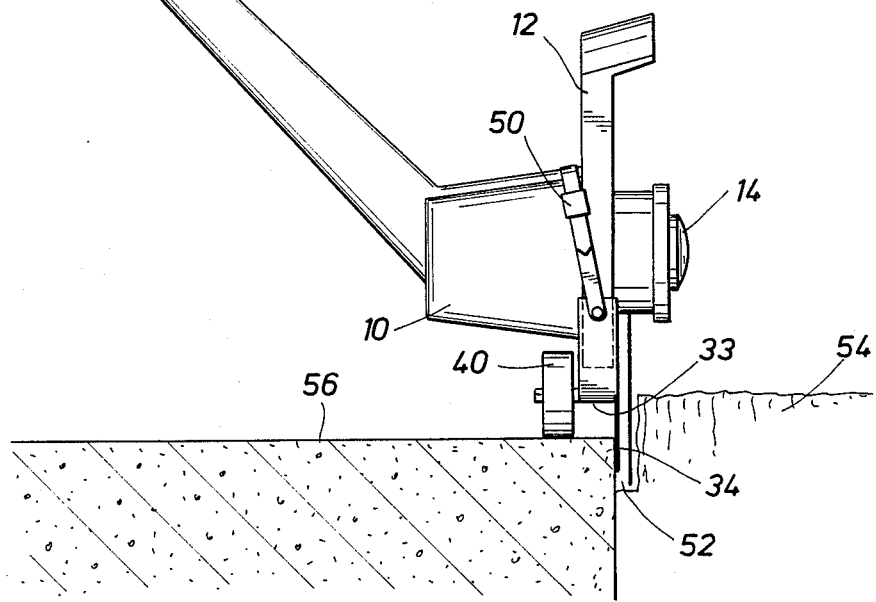
FIG. 2 is an end view of the lawn trimmer attachment of the invention shown attached to a nylon cord trimmer.

Referring first to FIG. 2 of the drawings, the apparatus of the invention is shown mounted to a commercially available lawn trimmer. The lawn trimmer includes a trimmer housing 10 supporting a debris shield 12 which is perpendicularly disposed to the trimmer housing 10. A spool and line housing 14 projects outwardly from the flat planar surface of the base of the trimmer housing 10 and the debris shield 12 and is operatively connected to an electric motor housed within the trimmer housing 10. A shaft 16 extends angularly upwardly from the trimmer housing 10. A D-shaped handle (not shown in the drawings) is located at about the midpoint of the shaft 16 providing a convenient hand hold for the operator of the lawn trimmer. A pistol grip handle is also provided at the terminal end of the shaft 16. The description thus far is of a typical, commercially available electric powered lawn trimmer which during normal usage has the base and debris shield 12 disposed substantially parallel to the ground for grass trimming purposes. In FIG. 2, the trimmer housing 10 of a conventional line trimmer has been rotated so that it is perpendicular to its usual horizontal operating position relative to the ground.

Figure 1:
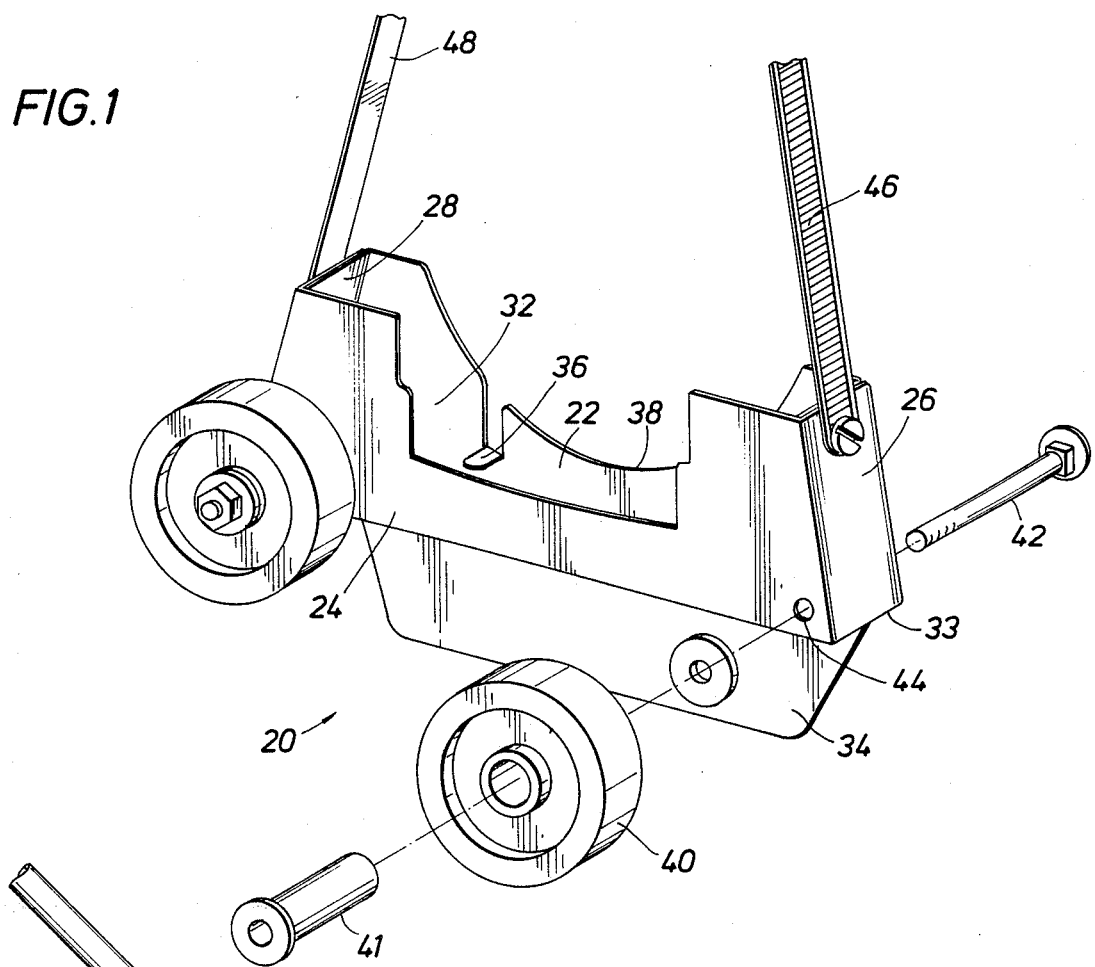
FIG. 1 is a perspective, partially exploded view of the attachment of the invention.

Referring now to FIG. 1, the lawn trimmer attachment of the present disclosure is generally identified by the reference numeral 20. The apparatus 20 is formed by a back plate 22 and a front plate 24 connected by end plates 26 and 28. A tapered edge guide 34 extends downwardly and is an extension of the back plate 22. The plates 22, 24, 26 and 28 define a recess or a cavity 32 which is closed at the bottom by a bottom plate 33. The cavity 32 is profiled or sized to receive a portion of the trimmer housing 10 therein. The trimmer housing 10 is provided with a nose portion which extends outwardly from the trimmer housing 10 and fits snugly within the cavity 32. Inwardly projecting tabs 36 provide a stop or support for the nose portion of the trimmer housing 10. The back plate 22 is provided with an arcuate edge 38 so that the back plate 22 does not contact or interfere with the spool and line housing 14 when the apparatus 20 is attached to the trimmer housing 10. A pair of wheels 40 are mounted to the body of the apparatus 20. The wheels 40 rotate on a spanner bushing 41 and are supported on an axle bolt 42 which extends through aligned holes 44 formed in the plates 22 and 24. The wheel axle may also be formed by a stud integrally formed with the body of the apparatus 20 and projecting therefrom. A lock nut and washer secure the wheels 40 and bushing 41 on the axle bolt 42. The attachment 20 is mounted to the housing 10 and secured thereon by straps 46 and 48 which extend about the housing 10 and are buckled together at 50. The straps 46 and 48 are secured to the body of the apparatus 20 by a screw, rivet or the like.

Referring again to FIG. 2, the apparatus of the invention is shown in use. When using the apparatus of the invention, the edge guide 34 extends into a trench 52 formed between the lawn 54 and the sidewalk or curb 56. The edge guide 34 engages the vertical side of the sidewalk 56 for guiding the lawn trimmer in a straight path while edging. The wheels 40 support the trimmer a sufficient distance above the sidewalk 56 and enable the trimmer to be rolled along the sidewalk 56 in a straight path in cooperation with the edge guide 34.

Figure 3:
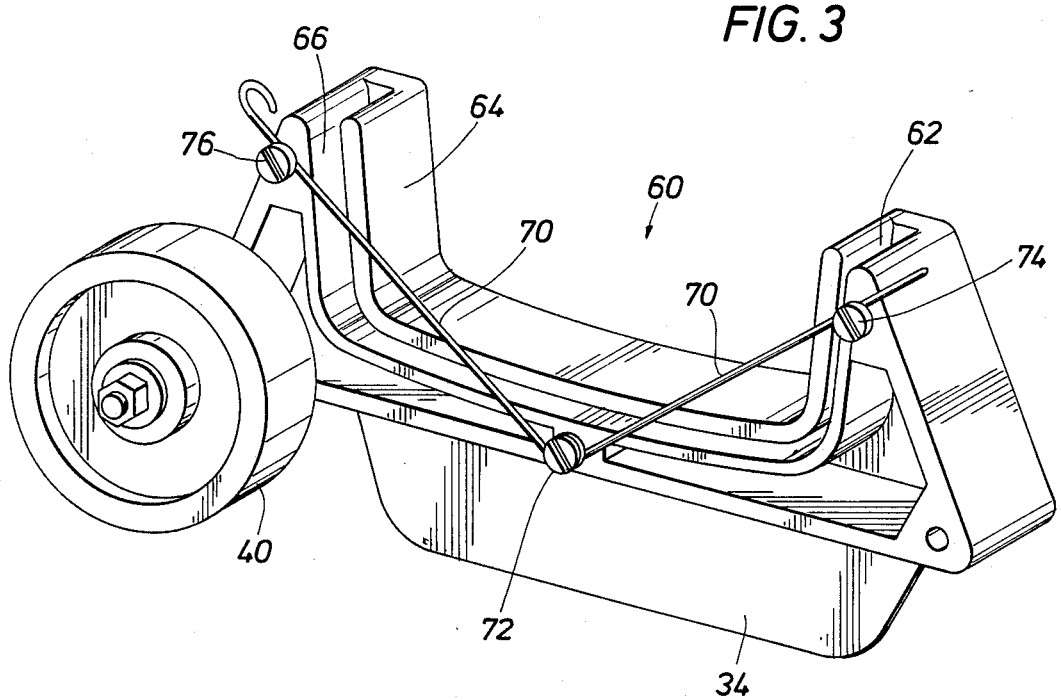
FIG. 3 is a partial perspective view of an alternate embodiment lawn trimmer attachment of the invention.
Figure 4:
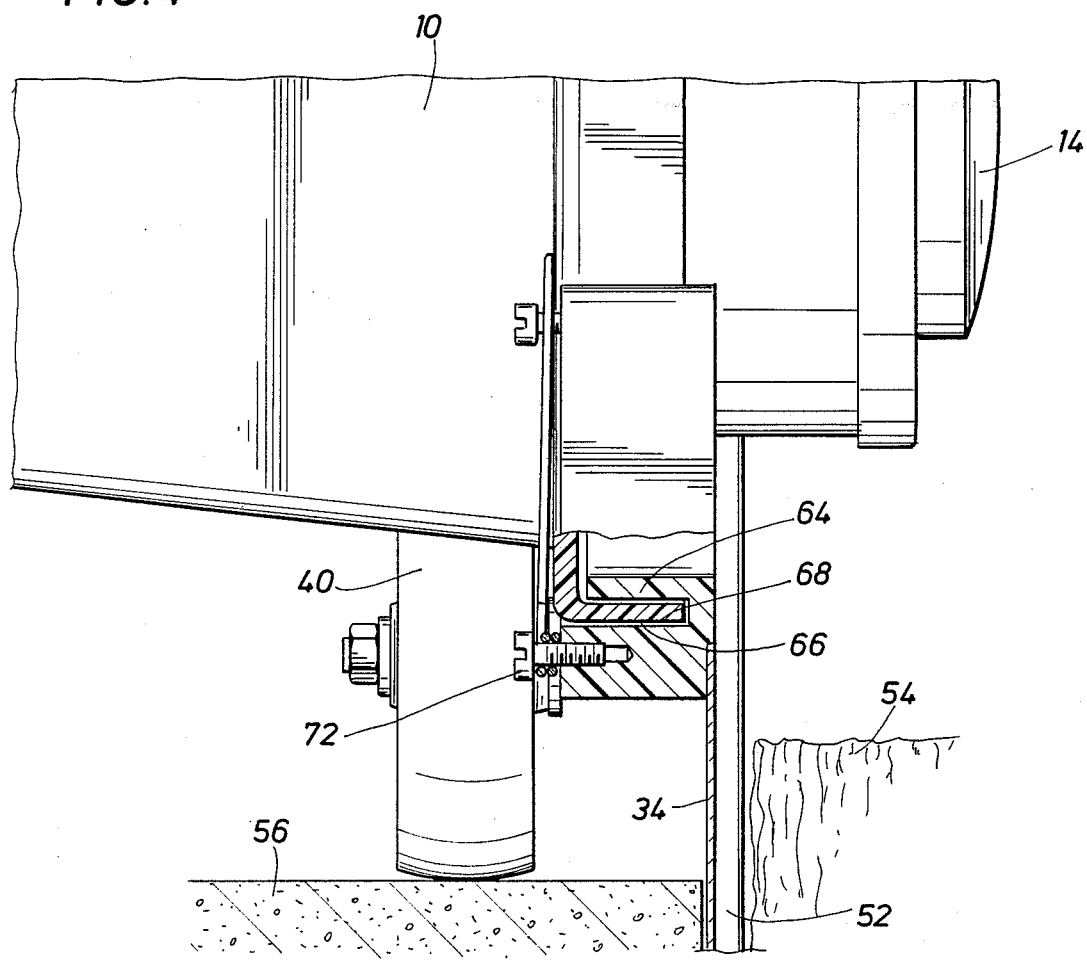
FIG. 4 is a partial sectional view of the alternate embodiment lawn trimmer attachment of the invention.

Referring now to FIGS. 3 and 4, an alternate embodiment of the lawn trimmer attachment of the invention is shown. The modified lawn trimmer attachment is similar to the attachment 20 described and shown in FIGS. 1 and 2. Therefore, like reference numerals have been employed to identify like elements. In the alternate embodiment of FIGS. 3 and 4, the body 60 of the lawn trimmer attachment is of one piece construction. The body 60 may be fabricated of metal, a hard plastic material or other suitable material. It is relatively small in size so that it does not interfere with the spool and line housing 14 when attached to the trimmer housing 10. It will be observed that the body 60 includes a slot or recess 62 defined between two spaced flange members 64 and 66. The recess 62 is sized and shaped to receive a lip portion 68 projecting from the nose portion of the trimmer housing 10.

When mounted on the housing 10, the attachment 60 is secured thereon by spring steel retaining arms 70. The arms 70 are looped around a pin 72 which is mounted to the body 60 as shown in FIGS. 3 and 4. The arms 70 angularly extend from the mounting pin 72 for engagement with retaining pins 74 and 76 mounted on the attachment 60. In the position shown in FIG. 4, it will be observed that the arms 70 engage the back surface of the nose of the trimmer housing 10 for securing the attachment 60 to the lawn trimmer. In operation, the attachment 60 functions in the same manner previously described with regard to the attachment 20. The edge guide 34 may be separately fabricated and bolted onto the body 60, or, alternatively, the edge guide 34 may be integrally fabricated with the body of the attachment 60, so that it extends downwardly into the trench 52 in the manner previously described.

Figure 5:
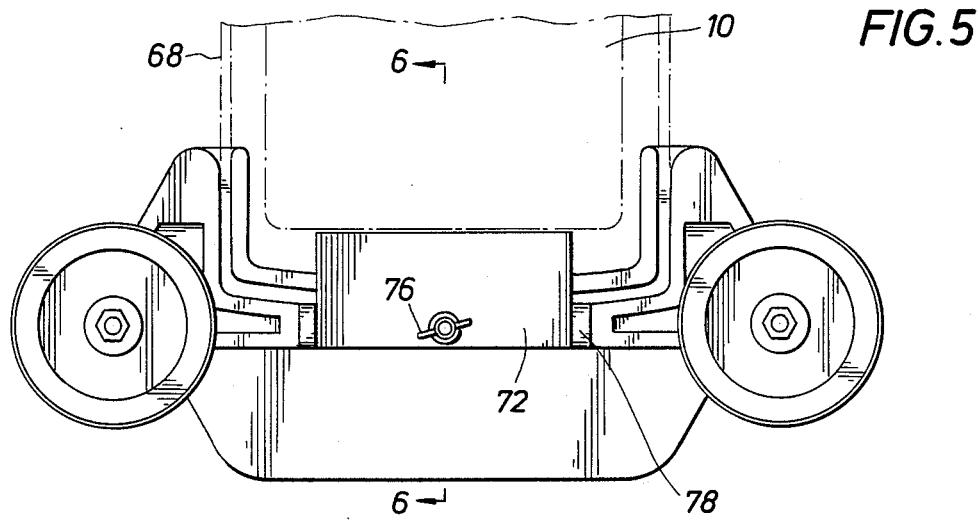
FIG. 5 is a side view of another alternate embodiment of the lawn attachment.
Figure 6:
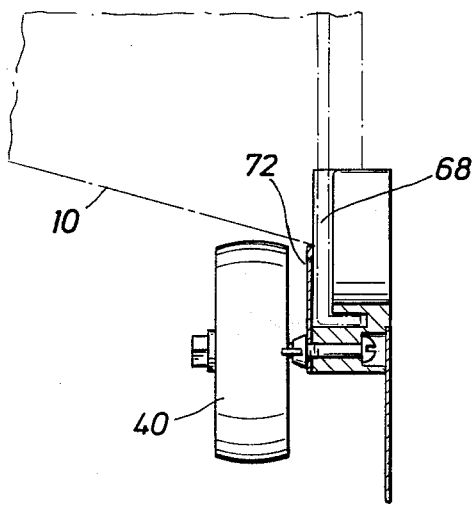
FIG. 6 is a sectional view of the lawn trimmer attachment taken along line 6—6 of FIG. 5.
Figure 7:
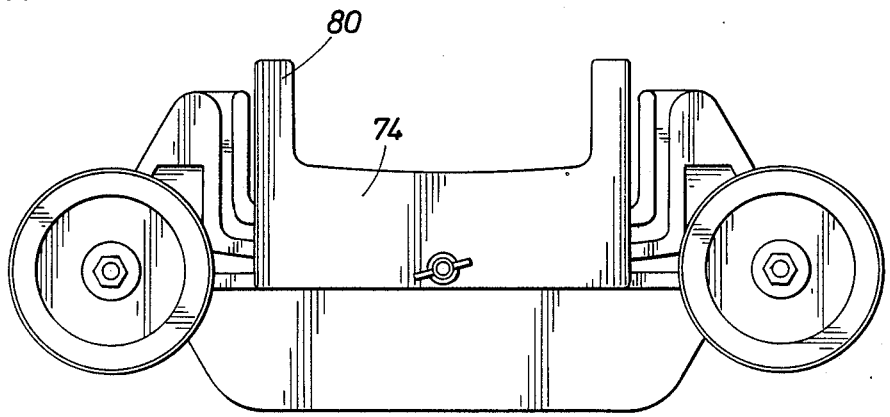
FIG. 7 is a side view of yet another alternate embodiment of the lawn trimmer attachment of the invention.

Referring now to FIGS. 5-7, yet another alternate embodiment of the attachment 60 is shown. In FIGS. 5-7, the spring arms 70 have been replaced by a connector plate 72 shown in FIGS. 5 and 6 or a connector plate 74 shown in FIG. 7. Different connector mechanisms increase the versatility of the attachment of the invention for connection to a variety of lawn trimmers. The profile of the motor housing of models of different brands of lawn trimmers vary and therefore require different connector mechanisms for securely retaining the attachment of the invention to the lawn trimmer housing. In FIG. 5, a substantially rectangular shaped plate is shown mounted to the body 60 of the attachment. The plate 72 is tightened by a thumb screw 76 which extends through the plate 72 and threads into the body 60. A pair of stop tabs 78 provide contact shoulders for the plate 72 to prevent it from becoming misaligned or disengaged from the back surface of the nose of the trimmer housing 10. The plate 74 functions in a similar fashion but includes a pair of arms 80 extending upwardly so that the plate 74 contacts a larger area on the back surface of the trimmer housing 10. The connector plate 74, having a larger contact area securely holds the attachment 60 to the trimmer housing 10 and thereby minimizes wobbling.

The lawn trimmer attachment of the present disclosure is light weight yet very sturdy to withstand the shock of repeated use. It is quickly and conveniently attached or detached from the trimmer housing for convenient conversion of a commercially available electric line trimmer to a nylon cord lawn edger.

While the foregoing is directed to the preferred embodiments of the present invention, other and further embodiments of the invention may be devised without departing from the basic scope thereof, and the scope thereof is determined by the claims which follow.

What is claimed is:

1. An attachment for converting a lawn trimmer into a lawn edger, the lawn trimmer including a housing enclosing a motor, a debris shield mounted to the motor housing and a spool and line housing projecting outwardly from the motor housing substantially perpendicular to the housing base and the debris shield, the attachment comprising:
   (a) a body detachably mounted to the motor housing, said body including a profiled cavity defined by a plurality of plate members for receiving a portion of the motor housing therein, said profiled cavity including means for supporting the motor housing received therein;
   (b) an edge guide depending downwardly from a bottom edge of said body for guiding the lawn trimmer along a path;
   (c) wheel means mounted to said body for rolling the lawn trimmer along the path; and
   (d) means for mounting said body to the lawn trimmer housing.

2. The attachment of claim 1 wherein said mounting means comprises a pair of spring retaining arms mounted on said body, said retaining arms being positionable to engage a portion of said motor housing for maintaining said body mounted thereon.

3. The attachment of claim 2 wherein said retaining arms extend angularly along said body from at least one looking member located on said body to a pair of spaced retaining pins mounted on said body.

4. The attachment of claim 3 wherein said retaining pins are integrally formed with said body.

5. The attachment of claim 1 wherein said mounting means comprises a plate threadably secured to said body for securely mounting said body to the trimmer housing.

6. The attachment of claim 1 wherein said mounting means comprises a pair of straps secured to said body which extend about said motor housing and buckle together to detachably mount said body to said motor housing.

7. The attachment of claim 1 wherein said profiled cavity is defined by spaced flange members for receiving a lip portion of said motor housing therein.

8. The attachment of claim 7 wherein said profiled cavity is sized and shaped to the profile of the lip portion of said motor housing.

9. The attachment of claim 1 wherein said body includes axle studs integrally formed with said body an projecting therefrom for mounting said wheel means on said body.

10. The attachment of claim 1 wherein said mounting means comprises a removable connector plate mounted on said body for locking said body to said motor housing, said connector plate having a pair of arms extending upwardly for engaging a back surface of said motor housing.

11. An attachment for converting a lawn trimmer into a lawn edger, the lawn trimmer including a housing enclosing a motor, a debris shield mounted to the motor housing and a spool and line housing projecting outwardly from the motor housing substantially perpendicular to the housing base and the debris shield, the attachment comprising:
   (a) a body detachably mounted to the motor housing, said body including a profiled cavity for receiving a portion of the motor housing therein;
   (b) an edge guide depending downwardly from a bottom edge of said body for guiding the lawn trimmer along a path;
   (c) wheel means mounted to said body for rolling the lawn trimmer along the path; and
   (d) means for mounting said body to the lawn trimmer, wherein said mounting means comprises a pair of spring retaining arms mounted on said body, said retaining arms being positionable to engage a portion of said motor housing for maintaining said body mounted thereon.

* * * * *